United States Patent
Yamasaki

(10) Patent No.: US 6,820,831 B2
(45) Date of Patent: Nov. 23, 2004

(54) WINDING METHOD AND DEVICE FOR PHOTO FILM AND PHOTO FILM CARRIER

(75) Inventor: Kazuki Yamasaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/096,826

(22) Filed: Mar. 14, 2002

(65) Prior Publication Data

US 2002/0130212 A1 Sep. 19, 2002

(30) Foreign Application Priority Data

Mar. 14, 2001 (JP) .................................. 2001-072669

(51) Int. Cl.⁷ .............................................. B65H 18/08
(52) U.S. Cl. ................ 242/332.7; 242/532; 242/532.7; 242/579
(58) Field of Search .......................... 242/532, 532.2, 242/532.7, 579, 332.7

(56) References Cited

U.S. PATENT DOCUMENTS

| | | | | |
|---|---|---|---|---|
| 3,567,147 A | * | 3/1971 | Engelsmann et al. | 242/332.7 |
| 3,589,637 A | * | 6/1971 | Wagner | 242/584.1 |
| 4,218,032 A | * | 8/1980 | Nagel et al. | 242/532 |
| 4,285,480 A | * | 8/1981 | Parker | 242/332.7 |
| 4,407,577 A | * | 10/1983 | Nakamura | 396/403 |
| 4,504,026 A | * | 3/1985 | Serizawa et al. | 242/532 |
| 4,688,737 A | * | 8/1987 | Kogane et al. | 242/532 |
| 5,149,004 A | * | 9/1992 | Sudau et al. | 242/529 |
| 5,683,052 A | | 11/1997 | Serizawa | |
| 5,718,393 A | | 2/1998 | Serizawa | |
| 5,820,054 A | | 10/1998 | Serizawa | |

FOREIGN PATENT DOCUMENTS

| | | | | |
|---|---|---|---|---|
| EP | 0145295 A1 | * | 6/1985 | B21C/47/06 |
| JP | 59073118 A | * | 4/1984 | B21C/47/06 |
| JP | 59227652 A | * | 12/1984 | B65H/25/30 |
| JP | 01043439 A | * | 2/1989 | B65H/19/28 |

\* cited by examiner

Primary Examiner—Kathy Matecki
Assistant Examiner—Sang Kim
(74) Attorney, Agent, or Firm—Sughrue Mion, PLLC

(57) ABSTRACT

In a photo film carrier for use with a photographic printer, a winding device includes a rotatable winder shaft for photo film. A feeding path introduces the photo film to the winder shaft. A leading end guide plate is curved in an arc shape at a predetermined interval L to the winder shaft, for receiving a leading end of the photo film having reached the winder shaft from the feeding path, to guide the photo film toward the winder shaft in an arc shape. A tightening guide mechanism is curved in an arc shape, for tightly fitting a leading end on the winder shaft by pressing the photo film from the feeding path, to prevent the leading end from being loose at the winder shaft when a second turn portion of the photo film comes to contact the leading end after substantially one rotation of the leading end.

22 Claims, 4 Drawing Sheets

WINDING METHOD AND DEVICE FOR PHOTO FILM AND PHOTO FILM CARRIER

BACKGROUND OF THE INVENTION

1. Field of the Invention

The present invention relates to a winding method and device for photo film and a photo film carrier. More particularly, the present invention relates to a winding method and device for photo film, and a photo film carrier in which the photo film can be prevented from being scratched or damaged.

2. Description Related to the Prior Art

There is a photo film cassette of the IX240 type which contains a roll of photo film, such as negative photo film. After the photo film is developed, the photo film is wound back on a cassette spool the photo film cassette, and accommodated in the photo film cassette. To print an image frame in the photo film to photographic paper, thermosensitive recording material or the like, a photo film carrier is used for setting the photo film cassette, from which the photo film is drawn out in the photo film carrier. The photo film from the photo film cassette is fed intermittently, to set the image frame in a position for image reading or image printing. In the reading or printing position, light is emitted by a light source and applied to the photo film at a predetermined time. Light transmitted by the photo film is obtained for reading or printing the image frame.

However, the photo film is involved with curls to a considerable extent, as the photo film is preserved in the photo film cassette in a form wound about the cassette spool. Portions of the photo film drawn from the photo film cassette are likely to entwine one another. Failure in smooth rewinding to the photo film cassette is likely to occur after printing operation with the photo film. The photo film is likely to have scratches, flexing, and other damages. To solve such problems, JP-A 8-006168 (corresponding to U.S. Pat. Nos. 5,683,052, 5,718,393 and 5,820,054) discloses a type of the photo film carrier, which has a winding chamber where a winder shaft winds the photo film from the photo film cassette. To wind the photo film, the winder shaft is rotated at a circumferential speed higher than a feeding speed of the photo film. The photo film is wound about the winder shaft in application of regularized tension to the photo film.

However, the photo film carrier of the prior art has a problem in that at least one turn of the photo film must be wound about the winder shaft before the turn of the photo film can be tightened. Surfaces of the photo film are rubbed by one another, and scratched or damaged. This problem is typically serious if the photo film is 135 type, because the photo film does not have a leader but has the image frame starting directly from a front end of the photo film.

SUMMARY OF THE INVENTION

In view of the foregoing problems, an object of the present invention is to provide a winding method and device for photo film, and a photo film carrier in which the photo film can be prevented from being scratched or damaged due to contact between photo film portions.

In order to achieve the above and other objects and advantages of this invention, a winding method for photo film is provided, in which the photo film is introduced to a winder shaft through a feeding path. A leading end of the photo film is tightly fitted on the winder shaft by pressing the photo film from the feeding path, to prevent the leading end from being loose at the winder shaft when a second turn portion of the photo film comes to contact the leading end after substantially one rotation of the leading end.

Also, a winding device for photo film is provided, and includes a rotatable winder shaft. A feeding path introduces the photo film to the winder shaft. A leading end guide plate is curved in an arc shape at a predetermined interval to the winder shaft, for receiving a leading end of the photo film having reached the winder shaft from the feeding path, to guide the photo film toward the winder shaft by bending in an arc shape. A tightening guide mechanism is curved in an arc shape, for tightly fitting the leading end on the winder shaft by pressing the photo film from the leading end guide plate, to prevent the leading end from being loose at the winder shaft when a second turn portion of the photo film comes to contact the leading end after substantially one rotation of the leading end.

Furthermore, a feeding mechanism feeds the photo film at a predetermined introducing speed V1 through the feeding path. A shaft drive mechanism rotates the winder shaft in a winding direction at a predetermined circumferential speed V2 higher than the introducing speed V1, whereby the guiding mechanism eliminates looseness from the leading end.

The winder shaft includes a core. A frictional lining member has a tubular shape, for covering the core, to capture the photo film frictionally.

The tightening guide mechanism includes a tightening guide plate. A bias member biases the tightening guide plate toward the winder shaft, to press the photo film.

The tightening guide mechanism further includes first and second press rollers, secured to the tightening guide plate, for pressing the photo film toward the winder shaft.

The tightening guide mechanism further includes first and second grooves, formed in the tightening guide plate, extended in an axial direction, for supporting the first and second press rollers in a rotatable manner, and at least portions of the first and second press rollers protrude from the first and second grooves.

The shaft drive mechanism includes a motor for rotating the winder shaft in the winding direction by rotating forwards, to wind the photo film about the winder shaft. A torque limiter is secured between an output shaft of the motor and the winder shaft, for causing the winder shaft to slip from the output shaft if load to the photo film becomes over a reference level in winding the photo film, and for transmitting rotation of the output shaft to the winder shaft.

The shaft drive mechanism further includes a one-way clutch, secured between the output shaft of the motor and the winder shaft, for transmitting rotation to the winder shaft when the motor rotates forwards, and for making the winder shaft free from the motor when the winder shaft rotates in an unwinding direction, to allow unwinding the photo film.

The one-way clutch is secured between the torque limiter and the winder shaft.

According to another aspect of the invention, a photo film carrier adapted for reading or printing an image frame in photo film is provided. The photo film carrier includes a loader unit for being loaded with the photo film, a winder unit for winding the photo film from the loader unit, a feeding path for passing the photo film from the loader unit to the winder unit, and an opening, formed in the feeding path, for external access to the photo film for reading or printing of the image frame. In the photo film carrier, the winder unit includes a rotatable winder shaft. A leading end guide plate is curved in an arc shape at a predetermined interval to the winder shaft, for receiving a leading end of the photo film having reached the winder shaft from the feeding path, to guide the photo film toward the winder shaft by bending in an arc shape. A tightening guide mechanism is curved in an arc shape, for tightly fitting the leading end on the winder shaft by pressing the photo film from the leading end guide plate, to prevent the leading end from being loose at the winder shaft when a second turn portion of the photo film comes to contact the leading end after substantially one rotation of the leading end.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
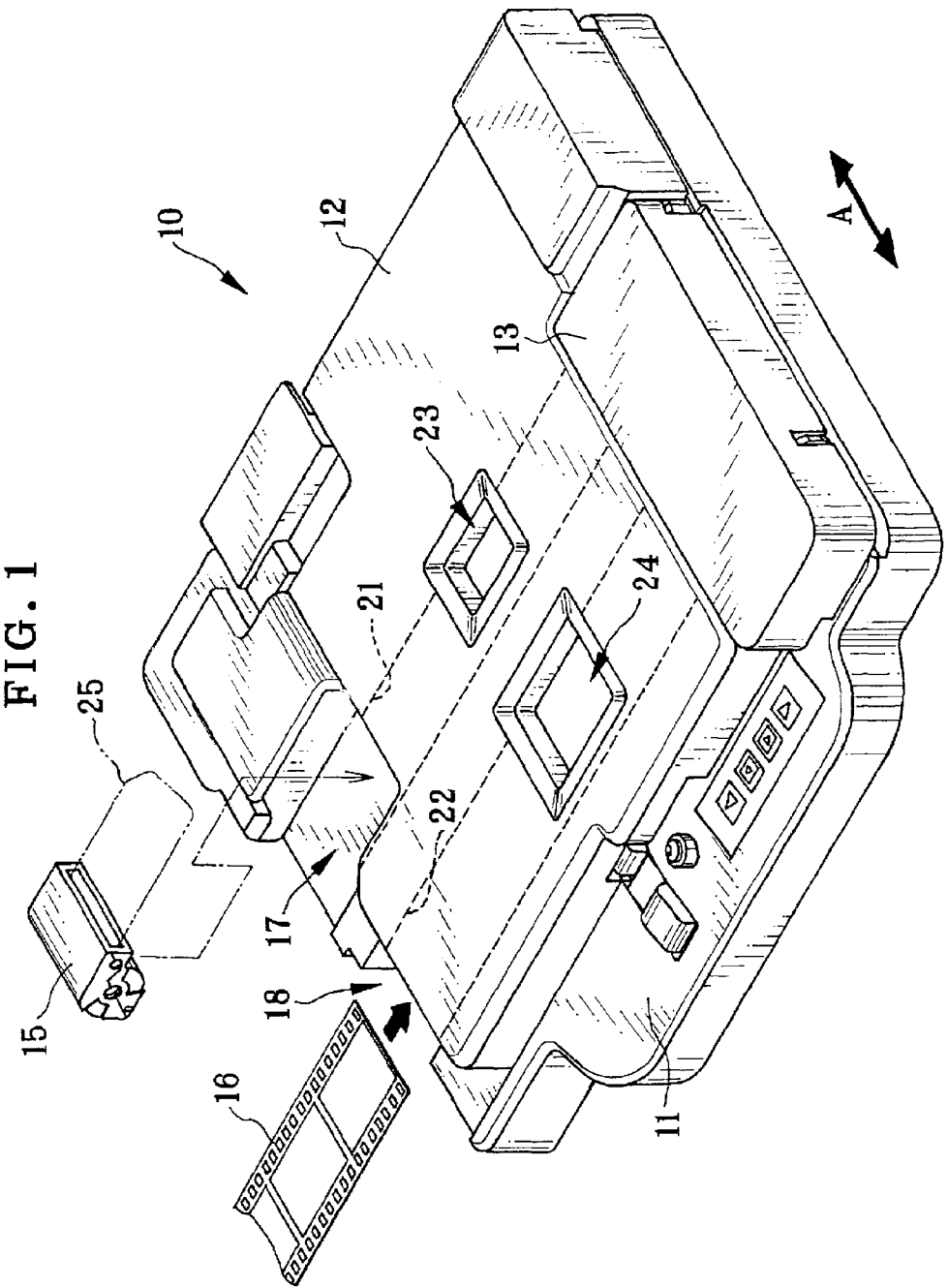
FIG. 1 is a perspective illustrating a photo film carrier.

In FIG. 1, a photo film carrier or holder 10 of the invention is illustrated. The photo film carrier 10 is used in a printer/processor (not shown), which is a machine constituted by a printer section and a processor section, for producing photographic prints. In the printer/processor, image frames are printed to photographic paper by use of developed photo film. Then the photographic paper is subjected to development, bleaching and fixation, rinsing and drying before prints are obtained.

The photo film carrier 10 includes a base plate 11, a cover 12, a winder unit 13 and the like. The photo film carrier 10 is used with either desired one of photo film cassette 15 of the IX240 type and photo film 16 of 135 type. The photo film carrier 10 includes a cassette loader unit 17 and a photo film loader unit 18. The cassette loader unit 17 is loadable with the photo film cassette 15 of the IX240 type. The photo film loader unit 18 is loadable with the photo film 16 of 135 type.

Feeding paths 21 and 22 are defined between the base plate 11 and the cover 12, have a width of the photo film, and extend from the cassette loader unit 17 and the photo film loader unit 18 to the winder unit 13. Exposure openings or access openings 23 and 24 are formed in portions of the feeding paths 21 and 22 to come through the base plate 11 and the cover 12, for taking an exposure of each frame image to photographic paper.

Figure 2:
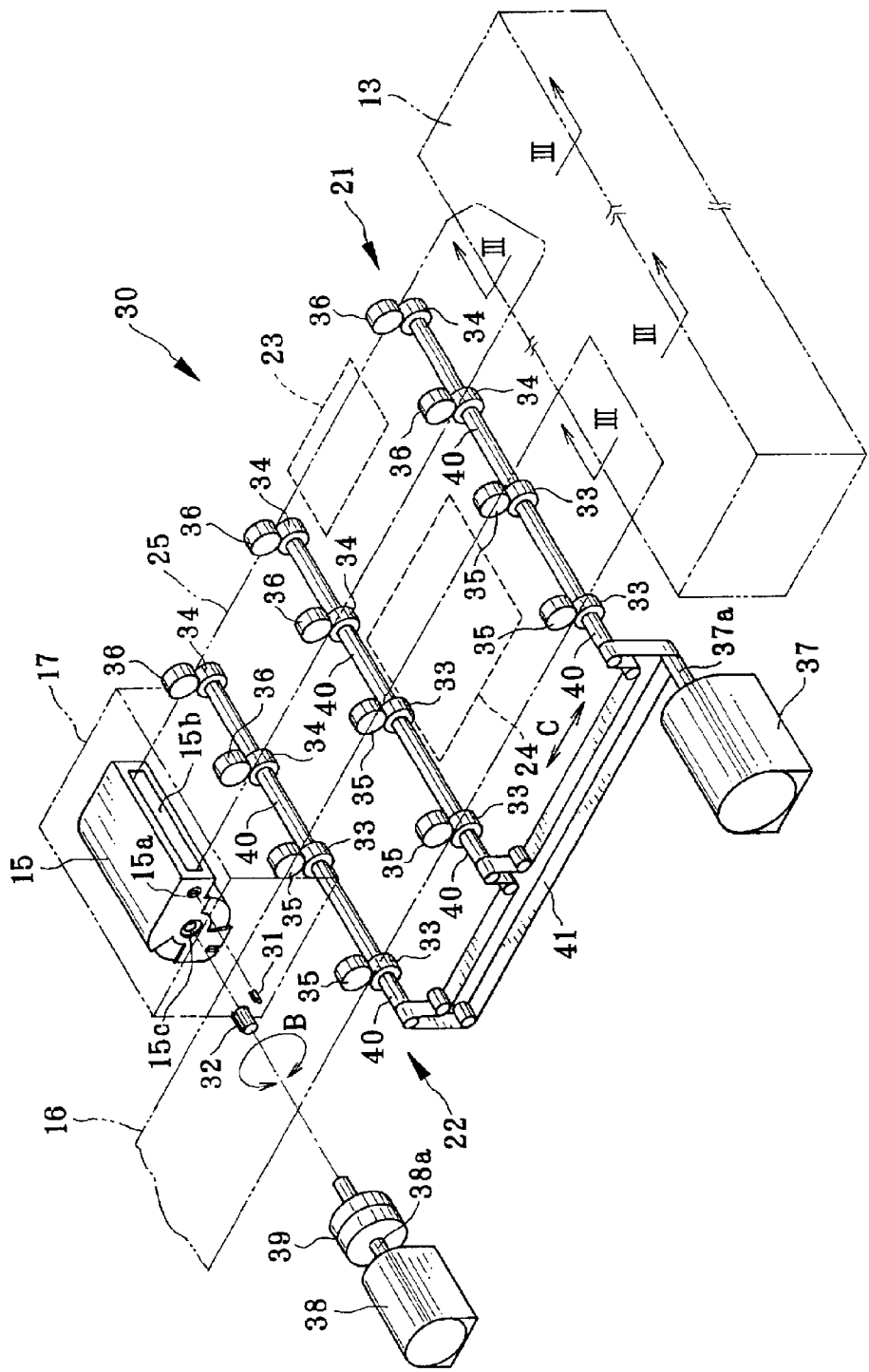
FIG. 2 is a perspective illustrating a feeder mechanism in the photo film carrier.

The photo film carrier 10 is movable in the direction of the arrow A in the printer/processor. Photo film 25 is the IX240 type, and drawn from the photo film cassette 15. For printing images of the photo film 25, the exposure opening 23 is set on an optical axis. For printing images of the photo film 16 of 135 type, the exposure opening 24 is set on the optical axis. In FIG. 2, a feeder mechanism 30 is illustrated, and feeds the photo films 16 and 25 to position frame images in each of the photo films at the exposure openings 23 and 24.

Upon positioning of the image frame, a light source in the printer/processor emits light for a predetermined time, to print the image to photographic paper.

In FIG. 2, the feeder mechanism 30 includes feed rollers 33 and 34. The feed rollers 33 feed the photo film 16 of 135 type. The feed rollers 34 feed the photo film 25 of the IX240 type. The number of the feed rollers 33 is three, but may be more or less than three. The number of the feed rollers 34 may be determined in the same manner.

The feed rollers 33 and 34 are disposed in a rotatable manner in the base plate 11. See FIG. 1. The feed rollers 33 and 34 are opposed to lateral edge portions of the photo films 16 and 25. Shafts 40 connect the feed rollers 33 and 34 with one another. A feeding motor 37 is disposed on the base plate 11. The feeding motor 37 has an output shaft 37a. An endless belt 41 is disposed to extend from the output shaft 37a to the shafts 40. Rotation of the feeding motor 37 is transmitted by the endless belt 41 to the feed rollers 33 and 34 which are rotated.

In FIG. 1, the cover 12 is provided with rotatable nip rollers 35 and 36. The nip rollers 35 and 36 are respectively opposed to the feed rollers 33 and 34, and squeeze edge portions of the photo films 16 and 25 in cooperation with the feed rollers 33 and 34. The feed rollers 33 and the nip rollers 35 constitute the feeding path 22 for 135 type. The feed rollers 34 and the nip rollers 36 constitute the feeding path 21 for the IX240 type. When the feeding motor 37 rotates, the photo film 16 or 25 is fed in the direction indicated by the arrow C.

There are various elements (not shown) such as photo film end sensor, perforation sensor, edge sensor and the like disposed on the feeding path 22 for 135 type. According to a detection signal from the edge sensor, each of frame images of the photo film 16 for 135 type is positioned at the exposure opening 24. The feeding path 21 for the IX240 type is provided with a magnetic head, perforation sensor and the like. While the photo film 25 is fed, the magnetic head reads various types of information recorded in a magnetic recording layer of the photo film 25, and also writes printing information to the photo film 25. The perforation sensor detects perforations formed in the photo film 25. In response to detection signals of the sensor, each of frame images of the photo film 25 is positioned at the exposure opening 23. After the positioning, each of frame images is printed to the photographic paper. After this, the photo films 16 and 25 become accommodated in respectively the winder unit 13.

In FIG. 1, the cassette loader unit 17 is disposed on an entry side of the feeding path 21 for the IX240 type. In FIG. 2, a shutter opener shaft 31 and a spool drive shaft 32 are disposed on one side of the cassette loader unit 17. The photo film cassette 15 has a shutter shaft 15a, a cassette shutter 15b and a spool shaft 15c. The shutter opener shaft 31 becomes engaged with the shutter shaft 15a and rotates the same in the direction of the arrow B. To advance the photo film 25, the shutter opener shaft 31 opens the cassette shutter 15b. When all the photo film 25 is wound back about the spool shaft 15c, the cassette shutter 15b is closed.

The spool drive shaft 32 is rotatable in the direction of the arrow B, and engageable with the spool shaft 15c of the photo film cassette 15. A spool drive motor 38 is connected with the spool shaft 15c, and rotates for advancing the photo film 25 from the photo film cassette 15, and for returning the photo film 25 into the photo film cassette 15.

The spool drive motor 38 has an output shaft 38a. A torque limiter 39 is secured between the spool drive shaft 32 and the output shaft 38a. The torque limiter 39, when load over a predetermined level is applied to it during movement of the photo film, rotates in a racing manner, to disconnect between the elements of driving.

Figure 3:
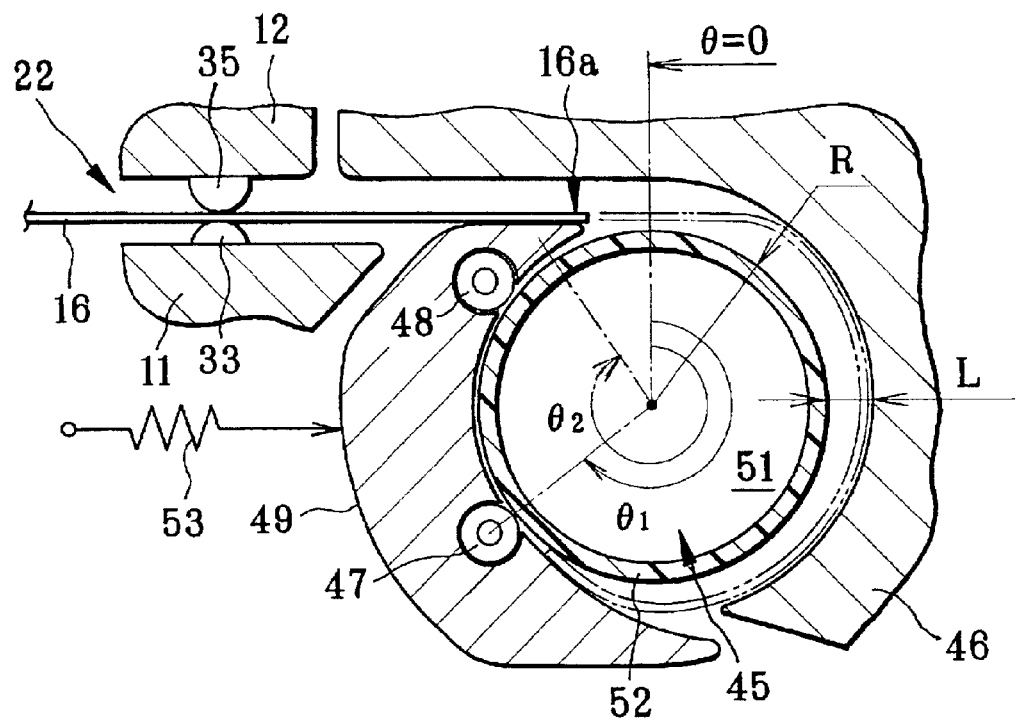
FIG. 3 is a cross section taken on line III—III in FIG. 2, illustrating a winder shaft, a leading end guide plate and a tightening guide mechanism.

FIG. 3 is a section taken on line III—III in FIG. 2 in which the winder unit 13 is illustrated. Note that a construction in the winder unit 13 for winding the photo film 25 of the IX240 type is basically the same as that for winding the photo film 16 of 135 type. The winder unit 13 includes a winder shaft 45, a leading end guide plate 46, a first press roller 47, a second press roller 48, and a tightening guide mechanism 49 with a tightening guide plate. The first press roller 47 is disposed at a first end of a pressing section. The second press roller 48 is at a second end of the same.

A core 51 is included in the winder shaft 45, and supported in a rotatable manner about an axis parallel with the width of the photo film 16. A frictional rubber lining 52 is fitted on the outside of the core 51 in a tubular shape. The winder shaft 45 including the frictional rubber lining 52 has a radius R. An inner face of the leading end guide plate 46 is nearly arc-shaped as viewed in cross section, and is distant from the winder shaft 45 by a distance L. The two press rollers 47 and 48 are supported on the tightening guide mechanism 49 in a rotatable manner. Peripheral portions of the two press rollers 47 and 48 protrude from the inner face of the tightening guide mechanism 49 to a small extent. A bias spring 53 is connected to an outer face of the tightening guide mechanism 49, and biases the tightening guide mechanism 49 and the two press rollers 47 and 48 toward the periphery of the winder shaft 45 constantly. Note that, although two press rollers 47 and 48 are used in the present embodiment, it is possible to use only one press roller, or three or more press rollers.

The two press rollers 47 and 48 are so disposed as to satisfy Condition 1 which will be indicated later. To define the condition, let $\theta1$ be an angle of the first press roller 47 from a reference position ($\theta=0$) where a leading end 16a will be sandwiched between the winder shaft 45 and a second turn portion of the photo film 16. An angle $\theta2$ is an angle of the photo film 16 from the reference position to the leading end 16a when the photo film 16 is tightly fitted on the winder shaft 45. Note that V1 is a feeding speed of the photo film 16. V2 is a circumferential speed of the winder shaft 45, and satisfies V1<V2. Also, $$\theta1 < \theta2 < 360°\ .\ (V2 \times L)/(V2-V1) = R \times (\theta2-\theta1)/\theta1 \qquad \text{Conditions 1}$$

The above Condition 1 for relative positions is obtained as follows. When the photo film 16 comes to the winder unit 13, the leading end 16a is guided by the leading end guide plate 46, and moved toward the tightening guide mechanism 49 in a path about the winder shaft 45. The photo film 16 moves further, to advance the leading end 16a toward the first press roller 47 in the tightening guide mechanism 49 as indicated by the phantom line. The leading end 16a becomes squeezed between the winder shaft 45 and the first press roller 47.

At this time, the photo film 16 is loose at an amount F of looseness without tight contact with the winder shaft 45.

$$F = 2\pi \times (R+L) \times \theta1/360 - 2\pi \times R \times \theta1/360 \qquad \text{Condition 2}$$

The leading end 16a, upon moving past the first press roller 47, is moved without coming away from the winder shaft 45. Therefore, it is desired to satisfy the following Condition 3:

$$V2 \times t = V1 \times t + F \qquad \text{Condition 3}$$

in order to fit the photo film 16 on the winder shaft 45 tightly, where t is time required for tightly fitting the photo film 16 on the winder shaft 45. Note that, in the equation, (V2×t) is a distance between the first press roller 47 and the leading end of the photo film 16 when the photo film is tightly fitted, and (V1×t) is a length of a portion of the photo film 16 newly fed to the winder unit 13 before tight fitting of the leading end 16a.

On the other hand, the distance (V2×t) is also expressed as follow $$(V2 \times t) = 2\pi \times R \times (\theta2-\theta1)/360 \qquad \text{Condition 4}$$

Figure 4:
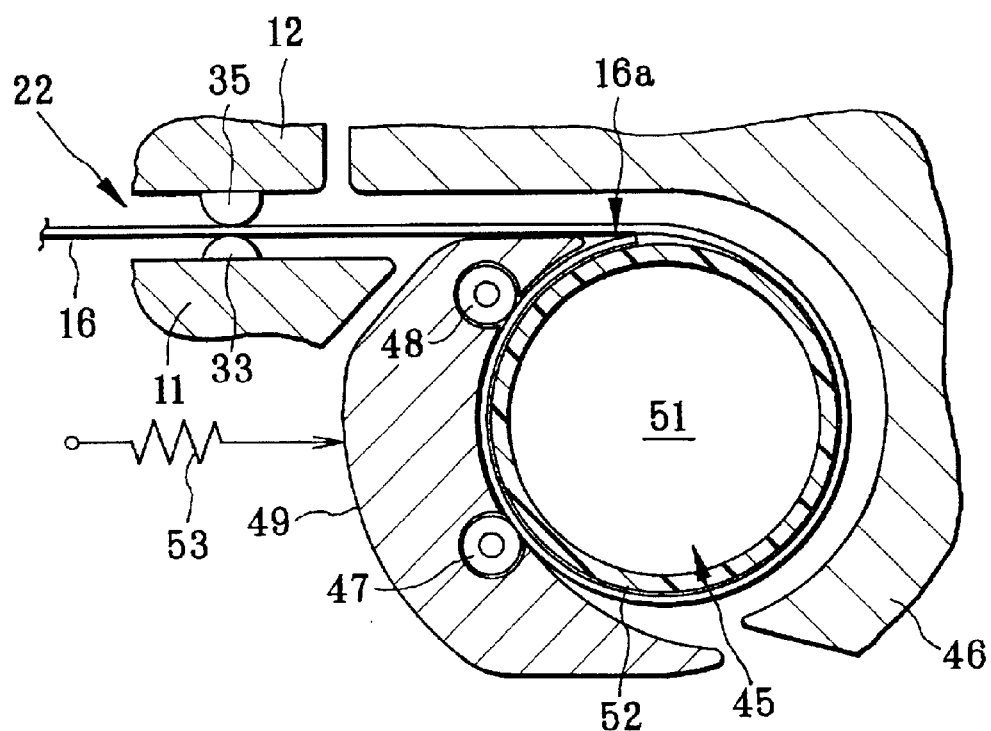
FIG. 4 is a cross section illustrating the same as FIG. 3 but at the time after winding one turn of photo film.

Consequently, Condition 1 is obtained according to Conditions 2, 3 and 4. Determination of the speeds V1 and V2 and the angles $\theta1$ and $\theta2$ according to Condition 1 is effective in that a leading portion of the photo film 16 becomes tightly fitted on the winder shaft 45 at the leading end guide plate 46 before the leading end 16a becomes sandwiched between the winder shaft 45 and a second turn portion of the photo film 16 newly fed to the winder unit 13. See FIG. 4. There is no contact or scratches between surfaces of the photo film 16 before being wound about the winder shaft 45. The photo film is safe from being damaged.

Figure 5:
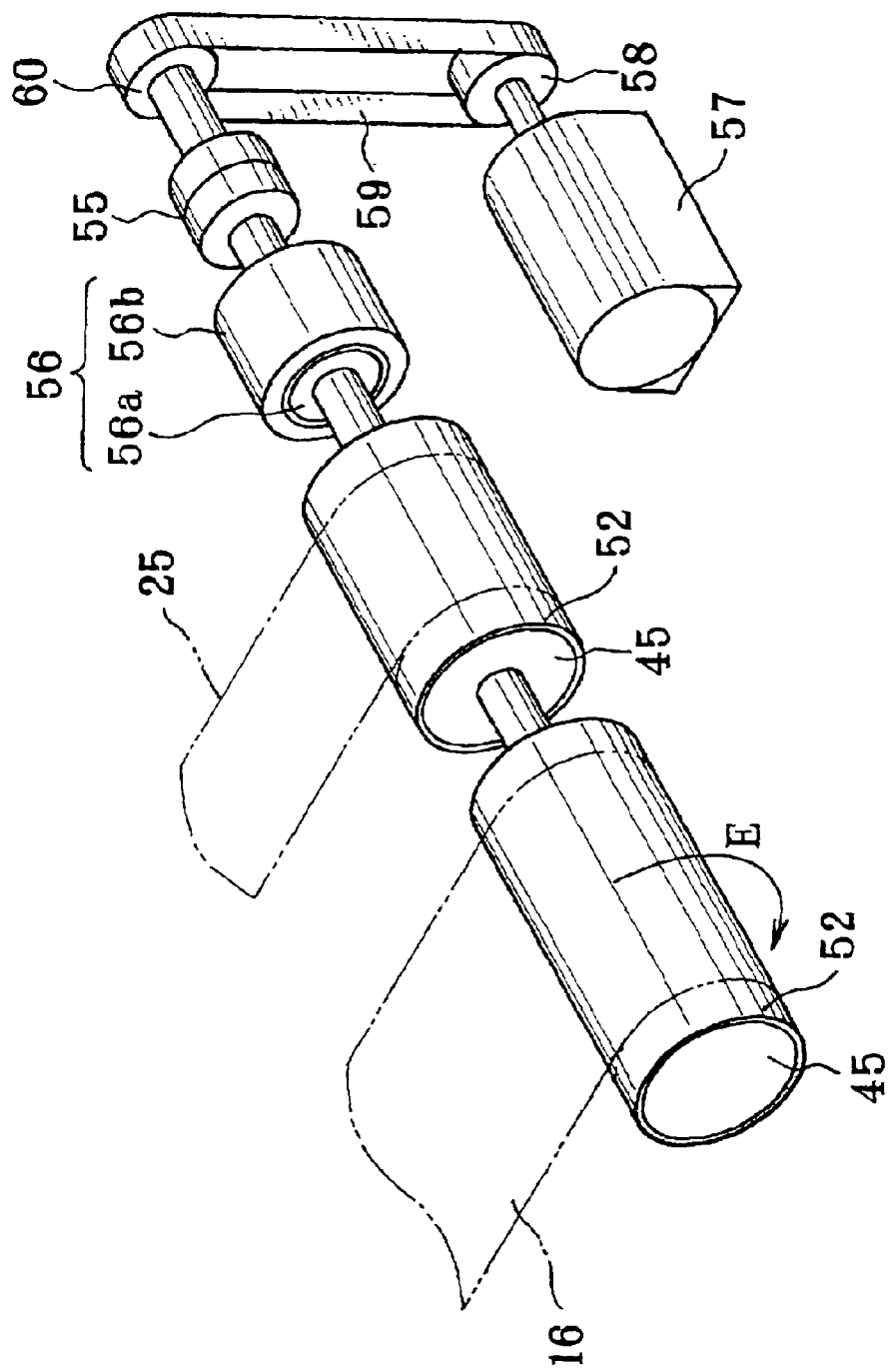
FIG. 5 is a perspective illustrating a the winder shaft and other elements in a winder unit.

In FIG. 5, a shaft drive mechanism drives the winder shaft 45, and includes a torque limiter 55, a one-way clutch 56, and a shaft drive motor 57. Rotation of the shaft drive motor 57 is transmitted by various elements including a pulley 58, an endless belt 59, a pulley 60, the torque limiter 55 and the one-way clutch 56.

The one-way clutch 56 includes two clutch barrels 56a and 56b. When the shaft drive motor 57 is driven to rotate the winder shaft 45 in the winding direction E, the clutch barrels 56a and 56b are rotated together without being free, to transmit rotation of the shaft drive motor 57 to the winder shaft 45. When the photo film 16 is unwound from the winder shaft 45, the clutch barrel 56a rotates relative to the clutch barrel 56b in a racing manner. So the winder shaft 45 rotates irrespective of the shaft drive motor 57.

While the shaft drive motor 57 rotates the winder shaft 45 in the winding direction E, it happens that load more than a predetermined level is applied by the shaft drive motor 57 to the winder shaft 45. In response to this, the torque limiter 55 causes rotation in a racing manner, to set the photo film winding speed equal to the photo film advancing speed. Thus, tension of a predetermined value can be applied to the photo film 16 in advancing about the winder shaft 45.

The operation of the above construction is described now. When the cassette loader unit 17 is loaded with the photo film cassette 15, at first the shutter opener shaft 31 becomes engaged with the shutter shaft 15a of the photo film cassette 15, and rotates to open the cassette shutter 15b. Then the spool drive shaft 32 becomes engaged with the spool shaft 15c, and rotates to feed the photo film 25 to the feeding path 21. At the time of the photo film 16 of 135 type, the leading end 16a is inserted into the photo film loader unit 18. A leading end sensor detects the leading end 16a, and causes the feeding motor 37 to rotate. The feed rollers 33 and 34 rotate to draw the photo film 16 into the feeding path 22.

The photo films 16 and 25 are nipped by the feed rollers 33 and 34 and the nip rollers 35 and 36, and fed toward the winder unit 13. For the photo film 25 of the IX240 type, a perforation associated with a first image frame is detected. In response to this, the feeder mechanism 30 positions the image frame at the exposure opening 23 and stops feeding. As the image frame is positioned at the exposure opening 23, light is emanated by a light source to the photo film 25 for a predetermined time, to print the image frame. At the end of printing, the feeder mechanism 30 feeds the photo film 25 again. When a perforation associated with a second image frame is detected, the image frame is positioned at the exposure opening 23 in a similar manner, to print an image to the photographic paper. Feeding and printing of the photo film 25 is repeatedly effected until image frames of the predetermined number are printed. Similarly, the photo film 16 of 135 type is fed to position an image frame at the exposure opening 24 according to detection signals from the edge sensor, before image frames are printed to the photographic paper.

After the printing operation, the photo films 16 and 25 are fed into the winder unit 13, and respectively wound about the winder unit 13. In FIG. 3, the leading end 16a is guided by the leading end guide plate 46 at the start of winding, and fed toward the tightening guide mechanism 49 in the path along the periphery of the winder shaft 45. The leading end 16a is further guided by the tightening guide mechanism 49 and fed toward the first press roller 47, and becomes squeezed between the winder shaft 45 and the first press roller 47.

The leading end 16a, having passed the first press roller 47, is kept fitted on the surface of the winder shaft 45 by the tightening guide mechanism 49 and the second press roller 48. As the circumferential speed of the winder shaft 45 is determined higher than the feeding speed, the portion of the photo film 16 near to the leading end 16a becomes tightly fitted on the winder shaft 45 before the leading end 16a becomes squeezed by the winder shaft 45 and a second turn portion of the photo film 16 newly fed into the winder unit 13. Thus, no scratch occurs to the photo film 16 due to contact between the plural turns of the photo film 16. After the leading end 16a is tightly fitted, the photo film 16 is wound about the winder shaft 45 at a regular tension kept by the torque limiter 55 connected with the winder shaft 45.

After printing of designated frame images, then the feeder mechanism 30 draws the photo film 16 from the winder unit 13. The bias spring 53 constantly biases the two press rollers 47 and 48 of the tightening guide mechanism 49 to the winder shaft 45, so the photo film 16 is prevented from being loose on the winder shaft 45. Also, the photo film 25 of the IX240 type is drawn from the winder unit 13, and simultaneously wound into the photo film cassette 15. When all the photo film 25 is wound about the spool shaft 15c, the shutter opener shaft 31 rotates to close the cassette shutter 15b.

In the above embodiment, Condition 1 is satisfied. However, the photo film winding of the invention may satisfy a condition in which a left-hand member of Condition 1 is equal to or smaller than a right-hand member of the same. This is because a left-hand member of Condition 3 can be equal to or greater than a right-hand member of the same. In short, a difference (V2−V1) by which the speed V2 is higher than the speed V1 can be sufficiently great in view of ensuring tight fitting of the leading end 16a to the winder shaft 45 at the tightening guide mechanism 49.

In the above embodiment, the photo film carrier is used with the photo film 16 of 135 type and the photo film 25 of the IX240 type. However, a photo film carrier of the invention may be used with three or more types of photo film, such as a Brownie photo film.

In the above embodiment, the photo film carrier is used in a photographic printer or printer/processor. However, a photo film carrier of the invention may be used in an image reader which includes CCD sensors or other pick-up elements for image reading. To read an image, various methods may be used. For example, the photo film may be intermittently fed frame by frame to read each of frame images. Also, the photo film may be fed continuously. CCD elements may be arranged in an array being crosswise to the feeding direction, and driven to read each frame image in synchronism with feeding.

Furthermore, photo film winding of the present invention may be used in any suitable types of optical instruments or devices for use with photo film.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A winding method of winding photo film, comprising a step of:
   in winding said photo film about a winder shaft, winding said photo film so that said photo film is fit on said winder shaft before a leading end of said photo film becomes lapped on said photo film after making one rotation about said winder shafts;
   wherein a tightening guide is used for winding said photo film about said winder shaft, and an exit of said tightening guide for said photo film is disposed close to a lapping position defined where said leading end of said photo film becomes lapped on said photo film after making one rotation around the winder shaft;
   wherein a portion of said photo film near to said leading end, which has not reached said tightening guide, is fit on said winder shaft before said leading end becomes lapped.

2. A winding method as defined in claim 1,
   wherein a peripheral speed of said winder shaft is predetermined to be higher than a transporting speed of said photo film, to remove looseness from said leading end at said lapping position about said winder shaft according to a difference of said speeds in passage of said tightening guide.

3. A winding method as defined in claim 2, wherein a leading end guide for said photo film is disposed away from a peripheral surface of said winder shaft, and guides said leading end of said photo film toward said tightening guide.

4. A winding method as defined in claim 3, wherein said winder shaft includes:
   a core; and
   a frictionally lining member, having a tubular shape, for covering said core, to capture said photo film frictionally.

5. A winding method as defined in claim 4, wherein said tightening guide includes:
   a guide plate; and
   a bias member for biasing said guide plate toward said winder shaft, to press said photo film; and
   a guide surface formed in said guide plate, said guide surface being an approximately concentric circular arc with said winder shaft except an inlet portion.

6. A winding method as defined in claim 5, wherein said tightening guide further includes first and second press rollers, secured to said guide plate, for pressing said photo film toward said winder shaft.

7. A winding device for winding a transported photo film about a winder shaft, comprising:
   a tightening guide disposed close to a lapping position defined where a leading end of said photo film becomes lapped on said photo film after making one rotation, said tightening guide pushing said photo film toward a peripheral surface of said winder shaft and winding said photo film so that said photo film is fit on said winder shaft;

a winder shaft driving unit for rotating said winder shaft at a peripheral speed predetermined to be higher than a transporting speed of said photo film, to remove looseness from said leading end at said lapping position about said winder shaft according to a difference of said speeds in passage of said tightening guide; and a leading end guide, disposed away from said peripheral surface of said winder shaft, for guiding said leading end of said photo film toward said tightening guide;

wherein a portion of said photo film near to said leading end, which has not reached said tightening guide, is fit on said winder shaft before said leading end becomes lapped.

8. A winding device as defined in claim 7, wherein said tightening guide includes first and second press rollers disposed away from one another in a circumferential direction of said winder shaft, for resiliently contacting said winder shaft, said first press roller is disposed close to a position of starting press of said tightening guide to said photo film toward said winder shaft, said second press roller is disposed close to a position of ending press of said tightening guide to said photo film toward said winder shaft.

9. A winding device as defined in claim 7, wherein said winder shaft driving unit includes a torque limiter for causing said winder shaft to rotate at a speed equal to or lower than a reference level by discontinuing transmission when winding load becomes equal to or higher than a reference load.

10. A winding device as defined in claim 9, wherein said winder shaft driving unit includes a one-way clutch disposed between said torque limiter and said winder shaft.

11. A winding device as defined in claim 10, wherein said winder shaft includes:

a core; and a frictional lining member, having a tubular shape, for covering said core, to capture said photo film frictionally.

12. A winding device as defined in claim 11, wherein said tightening guide includes:

a guide plate; and a bias member for biasing said guide plate toward said winder shaft, to press said photo film; and a guide surface formed in said guide plate, said guide surface being an approximately concentric circular arc with said winder shaft except an inlet portion.

13. A winding device as defined in claim 12, wherein said tightening guide further includes first and second grooves, formed in said guide plate, extended in an axial direction with respect to the winder shaft, for rotatably supporting said first and second press rollers, and at least portions of said first and second press rollers protrude from said first and second grooves.

14. A photo film carrier for transporting an image frame in photo film to a reading optical axis or printing optical axis for image reading or image printing, characterized in:

including said winding device as defined in claim 7.

15. A winding method as defined in claim 5, wherein said tightening guide further includes a second groove, formed in said guide plate, extended in an axial direction with respect to the winder shaft, for rotatably supporting said second press roller in a rotatable manner, and at least a portion of said second press roller protrudes from said second groove.

16. A winding method as defined in claim 3, wherein $(V2 \times L)/(V2-V1) = R \times (\theta_1 - \theta_2)$; and wherein V2 is the peripheral speed of said winder shaft, V1 is the transporting speed of said photo film, L is a radial distance between an outer surface of the winder shaft and an inner surface of the leading end guide, R is the radius of said winder shaft, $\theta_1$ is an angle of the first roller about the axis of rotation of said winder shaft with respect to a reference position where the leading end of the photo film would be sandwiched between said winder shaft and a second turn portion of the photo film, and $\theta_2$ is an angle of the leading portion of the photo film about the axis of rotation of the winder shaft with respect to the reference position when the photo film is tightly fitted on the winder shaft.

17. A winding method of winding photo film, comprising:

winding said photo film so that said photo film is fit on a winder shaft using a tightening guide including a guide plate, a first press roller, a first groove, formed in said guide plate, extended in an axial direction with respect to the winder shaft, for supporting the first press roller in a rotatable manner, wherein at least a portion of said first press roller protrudes from said first groove, and a bias member that biases said guide plate toward said winder shaft, to press said photo film toward a peripheral surface of said winder shaft, and winding a leading end of said photo film so that the leading end of the photo film becomes lapped on said photo film after making one rotation about said winder shaft after winding said photo film in a fitted manner on said winder shaft.

18. A winding device for winding a transported photo film about a winder shaft, comprising:

a tightening guide disposed close to a lapping position defined where a leading end of said photo film becomes lapped on said photo film after making one rotation, said tightening guide pushing said photo film toward a peripheral surface of said winder shaft and winding said photo film so that said photo film is fit on said winder shaft; wherein said tightening guide includes a guide plate, a first press roller, a first groove, formed in said guide plate, extended in an axial direction with respect to the winder shaft, for supporting the first press roller in a rotatable manner, wherein at least a portion of said first press roller protrudes from said first groove, and a bias member that biases said guide plate toward said winder shaft, to press said photo film toward the peripheral surface of said winder shaft;

a winder shaft driving unit for rotating said winder shaft at a peripheral speed predetermined higher than a transporting speed of said photo film, to remove looseness from said leading end at said lapping position about said winder shaft according to a difference of said speeds in passage of said tightening guide; and a leading end guide, disposed away from said peripheral surface of said winder shaft, for guiding said leading end of said photo film toward said tightening guide.

19. A winding method of winding photo film, comprising a step of:

in winding said photo film about a winder shaft, winding said photo film so that said photo film is fit on said winder shaft before a leading end of said photo film becomes lapped on said photo film after making one rotation about said winder shaft;

wherein a tightening guide is used for winding said photo film about said winder shaft, and an exit of said tightening guide for said photo film is disposed close to a lapping position defined where said leading end of said photo film becomes lapped on said photo film after making one rotation around the winder shaft; and a peripheral speed of said winder shaft is predetermined to be higher than a transporting speed of said photo film, to remove looseness from said leading end at said lapping position about said winder shaft according to a difference of said speeds in passage of said tightening guide, wherein a leading end guide for said photo film is disposed away from a peripheral surface of said winder shaft, and guides said leading end of said photo film toward said tightening guide, wherein said winder shaft includes a core, and a frictional lining member for capturing said photo film frictionally, said frictional lining member having a tubular shape for covering said core, and wherein said tightening guide includes: a guide plate; a bias member for biasing said guide plate toward said winder shaft, to press said photo film; and a guide surface formed in said guide plate, said guide surface being an approximately circular arc concentric with said winder shaft except at an inlet portion.

20. A winding method as defined in claim 19, wherein said tightening guide further includes a second groove, formed in said guide plate and extended in an axial direction with respect to the winder shaft, for rotatably supporting said second press roller, and further wherein at least a portion of said second press roller protrudes from said second groove.

21. A winding device for winding a transported photo film about a winder shaft, comprising:

a tightening guide disposed close to a lapping position defined where a leading end of said photo film becomes lapped on said photo film after making one rotation, said tightening guide pushing said photo film toward a peripheral surface of said winder shaft and winding said photo film so that said photo film is fit on said winder shaft;

a winder shaft driving unit for rotating said winder shaft at a peripheral speed predetermined to be higher than a transporting speed of said photo film, to remove looseness from said leading end at said lapping position about said winder shaft according to a difference of said speeds in passage of said tightening guide; and a leading end guide, disposed away from said peripheral surface of said winder shaft, for guiding said leading end of said photo film toward said tightening guide;

wherein said tightening guide includes: a guide plate; a bias member for biasing said guide plate toward said winder shaft, to press said photo film; and a guide surface formed in said guide plate, said guide surface being an approximately circular arc concentric with said winder shaft except at an inlet portion.

22. A winding device as defined in claim 12, wherein said tightening guide further includes first and second grooves, formed in said guide plate and extended in an axial direction with respect to the winder shaft, for rotatably supporting said first and second press rollers, and further wherein at least portions of said first and second press rollers protrude from said first and second grooves.

* * * * *